United States Patent [19]

Provencal et al.

[11] Patent Number: 4,721,949
[45] Date of Patent: Jan. 26, 1988

[54] SYSTEM FOR MEASURING GLAZE-ICE BY MICROPROCESSOR WITH NEW RELEASE MECHANISM INCORPORATED

[75] Inventors: Gilles Provençal, St-Bruno de Montarville; Yvon Côté, Longueuil, both of Canada

[73] Assignee: Hydro-Quebec, Montreal, Canada

[21] Appl. No.: 801,857

[22] Filed: Nov. 26, 1985

[30] Foreign Application Priority Data

Jul. 4, 1985 [CA] Canada ............................. 486319

[51] Int. Cl.⁴ .............................................. G08B 19/02
[52] U.S. Cl. .................................. 340/580; 73/170 R; 340/582
[58] Field of Search .............................. 340/580–583, 340/601–602, 962; 73/579, 170 R, 171; 343/704; 62/128; 244/134 R, 134 D, 134 F

[56] References Cited

U.S. PATENT DOCUMENTS

| | | | |
|---|---|---|---|
| 3,042,918 | 7/1962 | Casey | 343/704 |
| 3,277,459 | 10/1966 | Werner | 73/170 R X |
| 3,341,835 | 9/1967 | Werner et al. | 73/570 X |
| 3,517,900 | 6/1970 | Roussel | 244/134 F |
| 4,333,004 | 6/1982 | Forgue et al. | 340/580 X |
| 4,570,881 | 2/1986 | Lustenberger | 340/582 X |
| 4,629,149 | 12/1986 | Carson et al. | 244/134 R |

Primary Examiner—James L. Rowland
Assistant Examiner—Thomas J. Mullen, Jr.
Attorney, Agent, or Firm—Oblon, Fisher, Spivak, McClelland & Maier

[57] ABSTRACT

The disclosure describes a system for measuring glaze ice, comprising a glaze-ice detector, a device connected to the detector to generate a signal indicating the formation of a specific quantity of glaze ice on the detector, and another device which responds to the signal, and causes sufficient heating of the detector to melt the glaze ice formed on it. The detector is characterized by the fact that it removes the water formed by this melting of the glaze ice before a new quantity of glaze ice has formed on the detector and been detected. An advantage of this system is that it can detect any formation of glaze ice with accuracy and without error.

16 Claims, 8 Drawing Figures

MEASUREMENT OF OSCILLATION FREQUENCY & PROCESSING OF ACTION TO BE TAKEN WHEN DETECTING GLAZE ICE

Fig. 8

PROCESSING OF FREQUENCY INVERSIONS (FROZEN WATER DROPLET)

SYSTEM FOR MEASURING GLAZE-ICE BY MICROPROCESSOR WITH NEW RELEASE MECHANISM INCORPORATED

BACKGROUND OF INVENTION (a) Scope of the Invention

This invention involves a system for measuring glaze ice by means of a microprocessor, with a new release mechanism incorporated therewith. More specifically, the invention relates to a glaze-ice detector that eliminates the measurement errors of a system presently in use. Obviously, the expression glaze-ice also includes rime formations.

(b) Description of Prior Art

In an organization specializing in the transmission of electricity, as is the case with the Applicant, the network for observing freezing-rain storms is very important for tower design and the real-time remote monitoring of existing lines.

A study of the weather in a proposed line corridor comprises two equally important parts: the intensity of the impact on the lines during a freezing-rain storm, and the frequency of such an event or its probability in time. Using the information collected with glaze-ice detection equipment, lines can be designed with a good knowledge of the risks, and the extent and duration of mechanical failure during a severe accumulation of glaze-ice or rime can be predicted. The observations and information obtained from a network of glaze-ice detectors enables the transmission line project engineer to design a line at a level of risk that is highly acceptable from an economic point of view.

An electrical utility's high-voltage lines often pass through mountainous zones that are subjected to severe weather conditions. Certain line sections are more exposed than others, and on some occasions, rime and glaze-ice have been the direct cause of major collapses. In many other occasions, rime and glaze-ice have caused the damaging or rupture of overhead spacer-dampers, ground-wires, conductor, etc., which produce or may produce major power failures.

Because of the remoteness of the Applicant's transmission lines in isolated areas, and in view of the meteorological conditions associated with storms, it is very difficult to observe rime or glaze-ice. And when freezing-rain is falling, it is difficult to find out the amplitude, duration and gravity of the storm as well as its effect on the behaviour of the lines.

Ideally, this physical link should have sufficient mechanical reliability to ensure the transmission of power even when atmospheric conditions are unfavorable. However, experience in previous years has enabled utilities to identify certain sectors where the lines are more vulnerable. Although a fool-proof line does not exist, several solutions have been proposed to solve the problem. Except for moving the route of the lines, these solutions (reinforcement, or a strategy of rapid reconstruction to limit the duration of the line outage) do not eliminate the risk of a fault due to glaze-ice, and it is largely for this reason that we have designed a glaze-ice real-time observation network that can give the alarm and indicate the seriousness of the situation when freezing-rain occurs.

There are few instruments capable of detecting and/or measuring glaze-ice. And the instruments that are available on the market have been developed mainly for aviation needs.

The instrument that was best suited to the Applicant's needs and the most compatible with its teletransmission system was the ice detector of Rosemount Instruments Ltd., hereinafter called the "Rosemount". This ice detector is described in Canadian Patent No. 808,827 issued on Mar. 18, 1969 to the Rosemount Engineering Company Limited as well as in U.S. Pat. Nos. 3,277,459 of Oct. 4, 1966 and 3,341,835 of Sept. 12, 1967, both issued to the Rosemount Engineering Company.

The Applicant has used about thirty of these devices since 1972, within the framework of its glaze-ice observation programs for the existing or future 735-kV transmission system. This has enabled it to acquire good experience with this type of apparatus.

To summarize the essentials of the mode of operation of the Rosemount glaze-ice detector: it comprises a detector, a heater and a holding tube that ensures the required distance between the detector and the mounting plate. The assembly is screwed to a casing containing the electronic portion.

This apparatus detects the presence of glaze-ice by means of the detector which consists of an ultrasonic rod that vibrates axially. The natural frequency of this rod decreases as glaze-ice accumulates.

When the ice thickness reaches 0.51 mm (0.02 inches), a signal is emitted by the device's electronic interface and a de-icing system begins to operate. After seven (7) seconds, the accumulation of ice has been melted by an assembly of heating elements inside the holding tube, the captor cools down and the instrument is ready to receive a new accumulation of glaze-ice or rime.

As the Rosemount device was developed for the needs of aviation, it does not completely meet the needs of the Applicant. The Rosemount device consumes too much electricity. The voltage of 115 volts AC used for heating the detector is too high if the device is utilized in an isolated region. Finally, the Rosemount apparatus often gives erroneous results during freezing-rain storms, if it is attached to a fixed support. Under these conditions, water droplets have been seen at the base of the detector, after heating. These droplets are eventually transformed into ice after the heating period ends. This presence of ice at the base of the detector produces false measurements and false alarms, making the device ineffectual because of the unreliability of the information obtained.

The frozen water droplets at the base of the detector cause basic oscillation frequency to increase, as opposed to a decrease when glaze-ice accumulates. Since the Rosemount apparatus utilizes an analog comparison method that does not take into consideration the polarity of the variations in the basic frequency, the results obtained are consequently erroneous under the conditions just described. The positive variation in the basic frequency will hereinafter be referred to as frequency inversion.

There is therefore a real need for a device accuracy and without error, while consuming only a small quantity of electrical energy at low voltage.

SUMMARY OF INVENTION

In order to overcome the aforementioned disadvantages of the known detectors, the Applicant has developed a glaze-ice measurement system comprising a Rosemount detector, together with a means of removing the water formed on the detector after the glaze-ize has been melted by the heating of the detector, before a new specific quantity of glaze-ice is formed and detected on the detector. Moreover, this system has the advantage of consuming only a small amount of electrical energy.

A special feature of the invention is the method of removing the water formed on the detector. This comprises a solenoid and a device enabling the solenoid to mechanically pulsate the detector until all the water droplets on its surface have gone, while requiring only a small amount of electrical energy.

Preferably, the detector is mounted on a rod-mounted support that can pivot at one of its ends. The link between the rod and the support constitutes a pivot so that the support can pivot at two points after the rod slides vertically. The system also comprises a casing containing the solenoid, which is associated with the rod so that it can stimulate the rod and make it slide vertically. This excitation of the rod will make the support pivot on its two pivot points, and this will finally produce a lateral shaking of the detector.

Another feature of the invention is that the system comprises a skirt of flexible material covering the lower part of the detector as well as the release mechanism made up of the support, the pivots and the upper part of the rod. The skirt protects these components against the formation of glaze-ice. Preferably, the skirt is made of rubber capable of flexibility between about −40° C. and about +100° C.

Yet another feature of the invention is a holding collar placed at the top of the casing, with the rubber skirt inserted in this collar.

Another feature of the invention is that the rubber skirt is an inversely truncated cone whose top is slightly convex and outside surface comprises a series of circular ribs from the base of the cone to the top. The skirt is therefore subjected to the same vibrations as the detector when the latter is pulsated by the solenoid. The truncated shape and the ribs in the skirt promote the breaking of glaze-ice that eventually forms on the skirt when it folds under the effect of the solenoid's movement.

Another feature of the invention is that the system comprises a decoder which is connected to the detector by means of an oscillator and is connected also to the release mechanism. The decoder is an integral part of the reception interface, which in turn is connected to a transmission interface by a triaxial or coaxial cable. The transmission interface is an integral part of a microprocessor system as the brain of the measurement system. The reception interface has an oscillator enabling the detector to produce a signal, and it also has a decoder capable of determining if the detector should be heated or excited, depending on the needs. The transmission interface translates the signals sent by the microprocessor to the detector and vice versa.

A local memory can also be integrated into this system. The memory contains a data-acquisition module, serving to compile results in the case of isolated stations not connected by means of a data-transmission system, and/or in case of a failure of the transmission system.

BRIEF DESCRIPTION OF DRAWINGS

The invention will now be described in more detail, with references to the appended drawings which are given merely by way of illustration and without intending to limit the scope of the invention. In the drawings that illustrate the invention.

DESCRIPTION OF PREFERRED EMBODIMENTS

These drawings, particularly to FIGS. 1, 2, 3 and 4, show that the glaze-ice-detector invention is in the form of ultrasonic detector 1 which is known per se. This part of the measurement system constituted by the detector is completely conventional and is not part of the invention's characteristics.

As explained above, when the detector has been heated to melt glaze-ice, water flows downward. Then, under the weather conditions normally prevailing when freezing-rain may occur, ice forms mainly at the base of the detector, giving a false reading.

To overcome this disadvantage, ultrasonic detector 1 has been mounted on support 5 which is arranged to pivot at 7 at one of its ends, and is mounted on rod 9. The link between rod 9 and support 5 is constituted by pivot 8 so that the support can pivot at both 7 and 8 after rod 9 slides vertically. The system comprises casing 11 containing solenoid 15, which is associated in a known manner with rod 9 so that the latter will be excited and slide vertically. This excitation of the rod 9 will make support 5 pivot at and 8, as mentioned above, which will finally shake detector 1 laterally in the direction of arrows 17 and 19.

Figure 1:
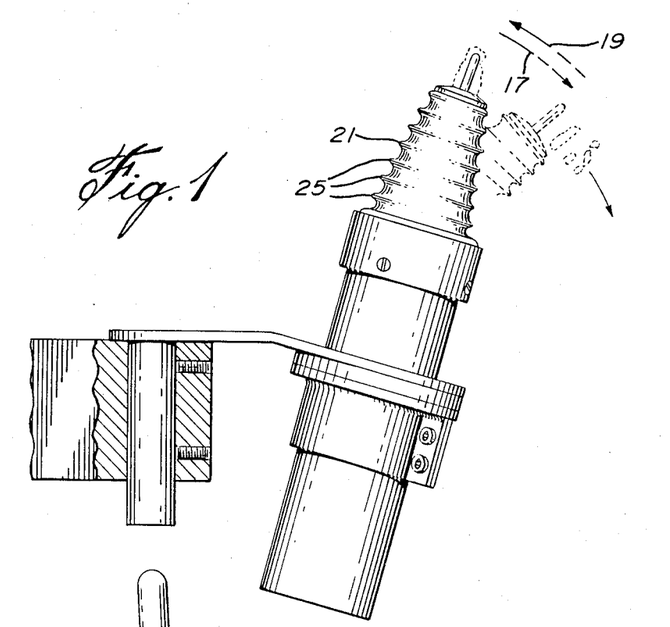
FIG. 1 is a schematic view of the assembly of the measuring apparatus, including details of the rubber skirt.
Figure 2:
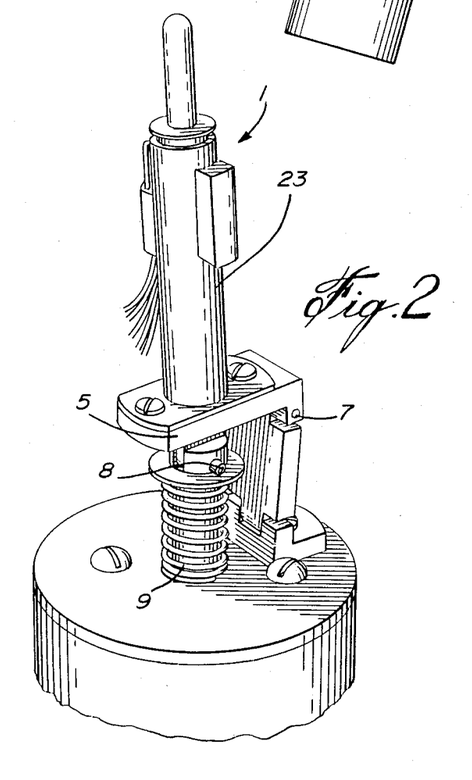
FIG. 2 is an illustration of the release mechanism.
Figures 3, 4:
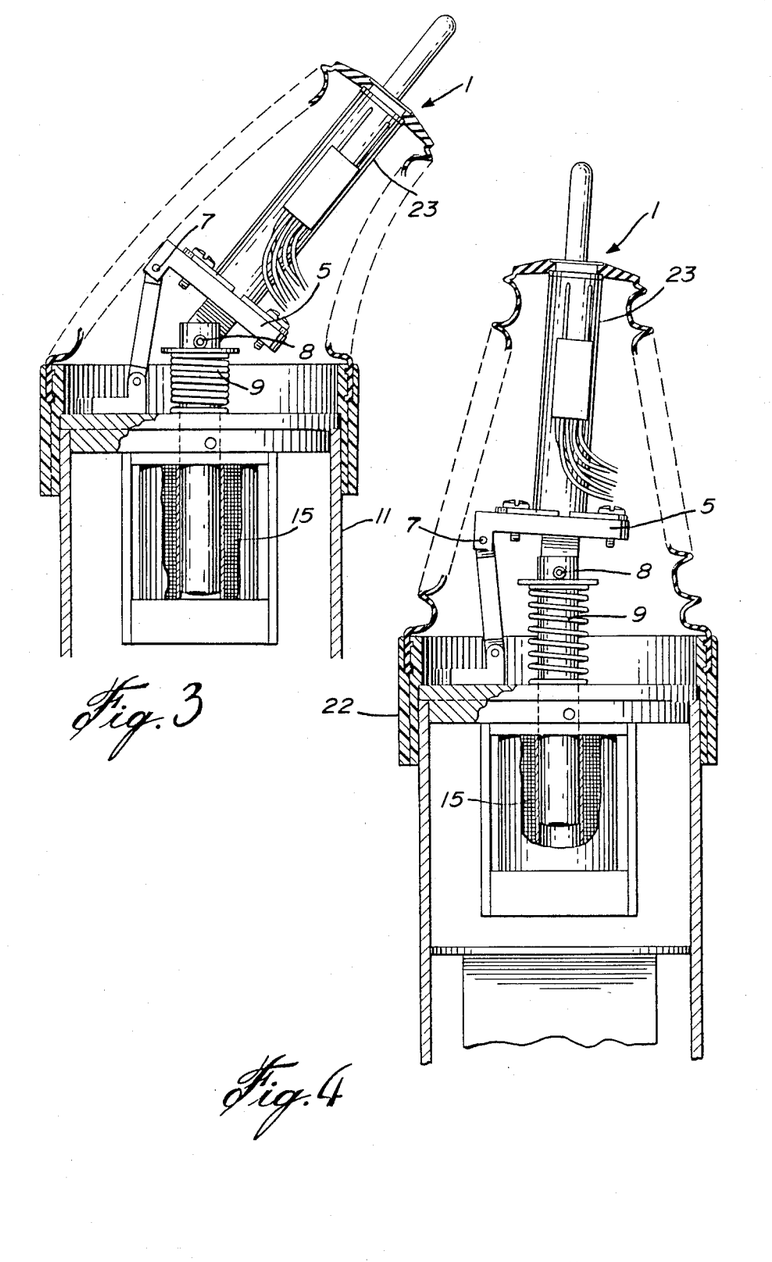
FIG. 3 is an illustration of the release mechanism in the excitation position.
FIG. 4 is an illustration of the mechanism as well as the collar for the skirt.

The detector in the invention also comprises skirt 21 shaped like an inversely truncated cone whose top is slightly convex, as shown on FIG. 1. As the drawings indicate, the skirt is made of a flexible material. The preferred material is rubber capable of flexibility between about −40° C. and about +100° C. The skirt should cover the lower part 23 of the detector, as well as the release mechanism made up of support 5, pivots 7 and 8, and the upper part of rod 9, so as to protect these components against the formation of glaze-ice. Skirt 21 is adjusted around holding collar 22 installed in the upper part of the casing.

The outside surface of skirt 21, comprises a series of circular ribs 25 extending from the base of the inversely truncated cone to the top of it. The skirt is subjected to the same shaking as the detector when the latter is pulsated by solenoid 15. Moreover, it is obvious that the inversely truncated shape and ribs 25 of skirt 21 promote the breaking of glaze-ice eventually present on skirt 21 when the latter folds under the effect of the solenoid's pulses.

Figure 5:
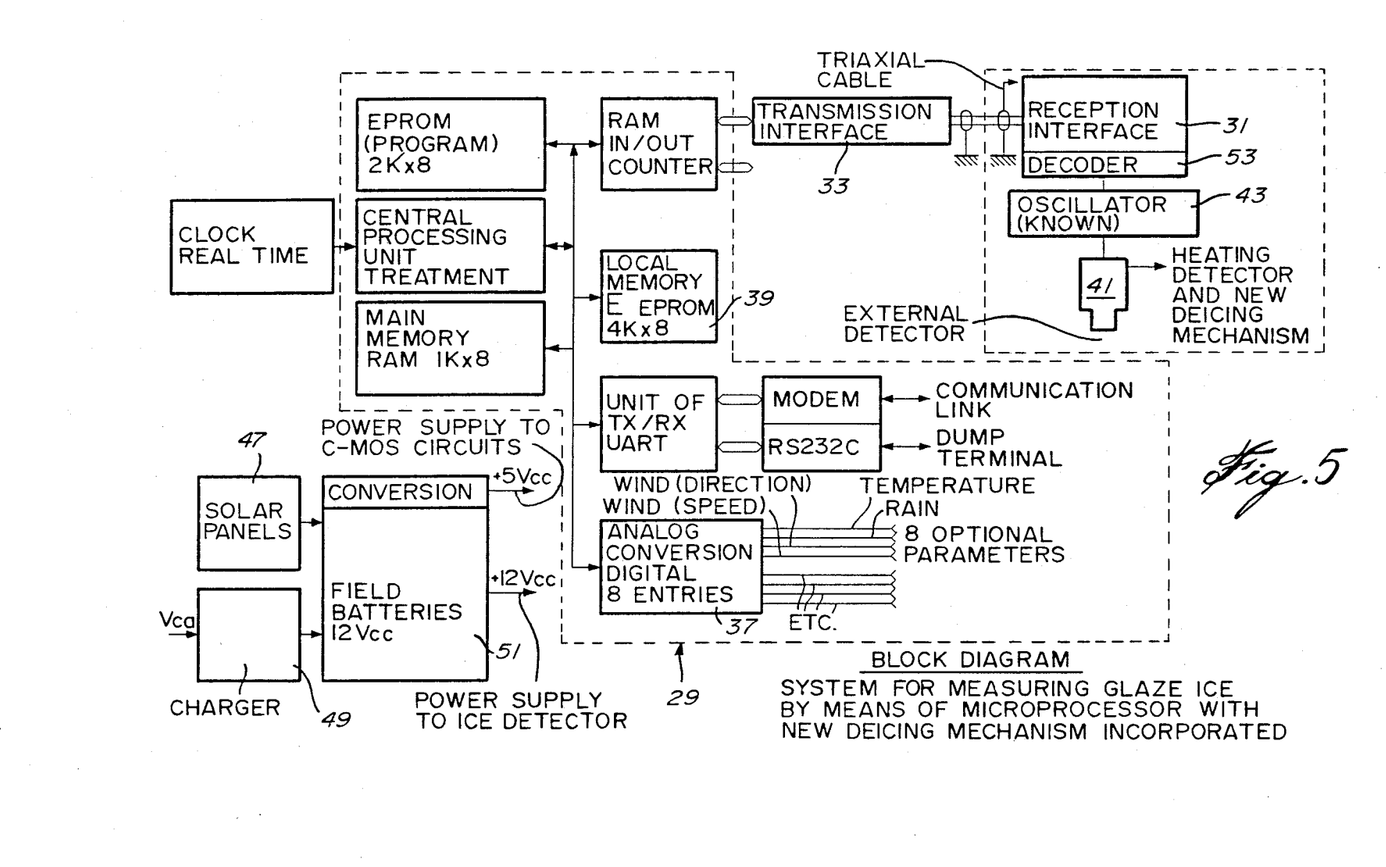
FIG. 5 is a schematic diagram of a glaze-ice measurement system incorporating this invention.

The system of measuring glaze-ice with this invention comprises microprocessor 29, which will be discussed further on. FIG. 5 shows that the system also comprises decoder 53 connected to detector 1 by oscillator 43 and to release mechanism 41. Decoder 53 is an integral part of reception interface 31, which in turn is connected to transmission interface 33 by triaxial cable 45 (although a coaxial cable could also be used). The transmission interface is an integral part of microprocessor system 29 acting as the brain of the measurement and control system.

In areas where there is no access to a conventional source of electrical energy, the power source is connected to a known system supplied by a solar panel (or any other independent source of energy).

After data have been read by an analog/digital conversion system 37, they can be transmitted to a data-processing system by any known means, such as satellite, microwaves, telephone lines or radio.

The system can also comprise integrated local memory 39 and a data-acquisition module (not illustrated). A local memory is incorporated in cases where stations are isolated and not connected by a data-transmission system. This local memory 39 will also be used in case of failure of the data-transmission system and could easily be read either on site or in the office by replacing local memory 39.

For a better representation of the invention's system, except for the release mechanism itself, reference will be made particularly to FIGS. 5 and 6.

FIG. 5 illustrates the detector as well as the microprocessor associated with it. The heating detector and the release mechanism are shown diagrammatically at 41. FIG. 5 also shows oscillator 43 and reception interface 31, including decoder 53 and transmission interface 33, all interconnected, by triaxial cable 45.

If a power source independent of the convention electrical-distribution circuit is required, solar panels 47 and battery supply 51 can be used. When a conventional power source is tapped, charger 49 and battery supply 51 can be used.

Figure 6:
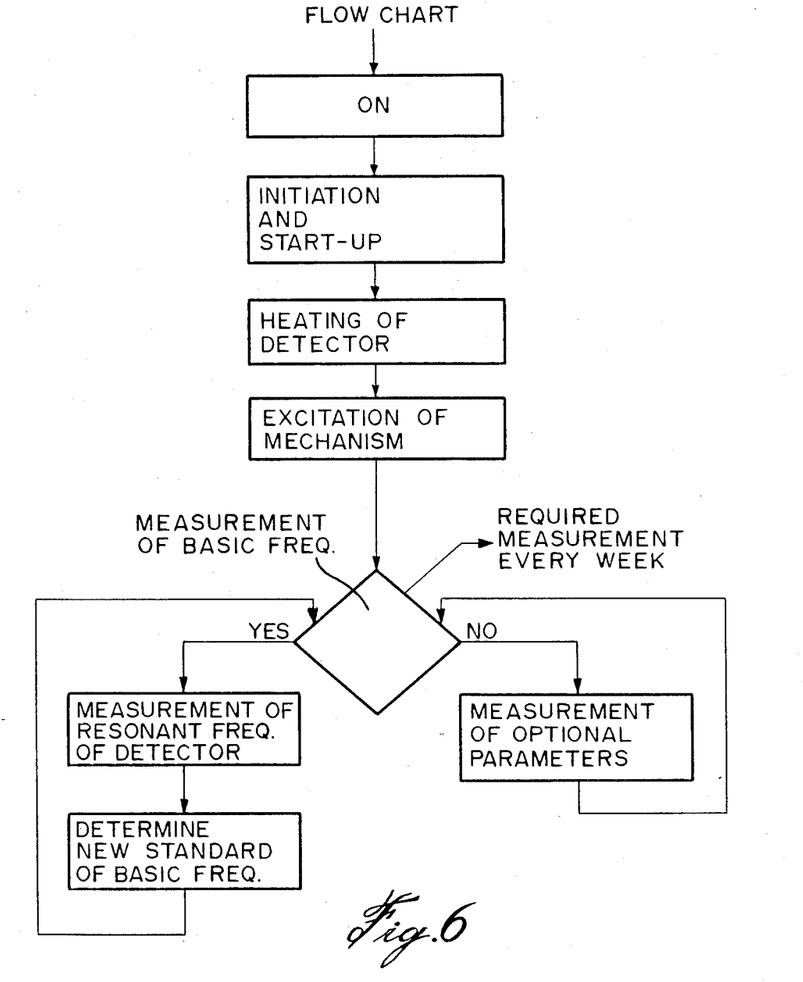
FIG. 6 is a flow chart illustrating the program for measuring optional parameters and the resonant frequency.

FIG. 6 indicates the steps followed to establish a program for measuring the optional parameters and the basic frequency.

Figure 7:
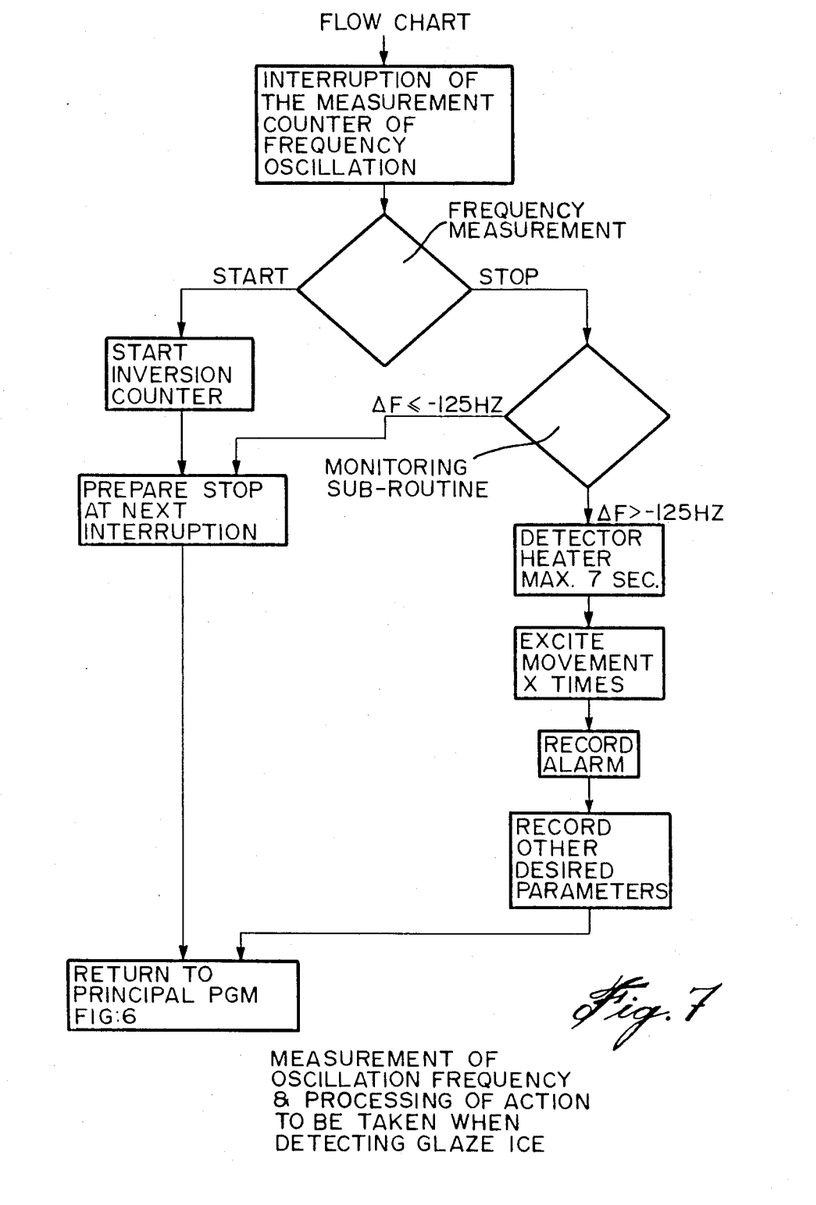
FIG. 7 is a flow chart illustrating the measurement of the frequency of oscillation and the sequence of actions to be taken when detecting glaze-ice.

FIG. 7 shows the procedure for measuring the frequency of oscillation as well as the action to be taken when detecting glaze-ice.

Figure 8:
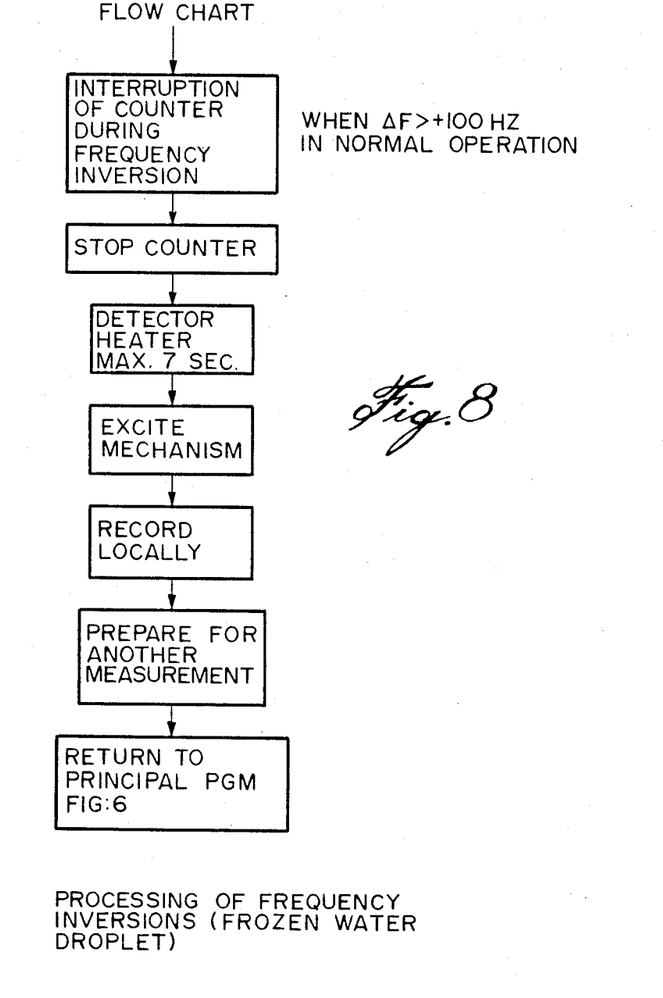
FIG. 8 is a flow chart illustrating the processing of frequency inversions.

Finally, when there is frequency inversion following the unexpected formation of a drop of water, the procedure for connecting this process is as illustrated in FIG. 8.

We claim:

1. A system of measuring glaze-ice comprising a glase-ice detector, means connected to said detector for generating a signal indicative of the formation of a specific quantity of glaze-ice on said detector, heating means responsive to said signal to heat said detector to melt the glaze-ice formed thereon, wherein said system comprises means to remove the water formed on said detector following the melting of glaze-ice resulting from the heating of said detector, before a new specific quantity of glaze-ice is formed and detected on said detector.

2. A glaze-ice measurement system according to claim 1, wherein the means to remove the water formed on said detector comprises a solenoid and a device enabling the solenoid to mechanically pulsate said detector until all water droplets have been removed from the surface thereof.

3. A glaze-ice measurement system according to claim, 2 which comprises a pivoting support on which said detector is mounted, a first pivot at one end of said support, a rod on which said support is installed, a second pivot connecting said rod to said pivoting support, said rod being associated with said solenoid, the lower part of said rod as well as said solenoid being enclosed in a casing, the upper part of said rod being able to slide vertically outside said casing, said solenoid acting on said rod to excite the latter and make it slide vertically, so as to cause the support to pivot on said first and second pivots, thereby producing a lateral shaking of said detector.

4. A glaze-ice measurement system according to claim 3, which comprises a skirt of flexible material covering the lower part of said rod, as well as a release mechanism made up of the pivoting support, the pivots and the upper part of the rod, thereby protecting these components aganist the formation of glaze-ice.

5. A glaze-ice measurement system according to claim 4, wherein the skirt is made of rubber capable of flexibility between about $-40°$ C. and about $100°$ C.

6. A glaze-ice measurement system according to claim 5, which comprises a holding collar placed at the top of said casing to receive said skirt.

7. A glaze-ice measurement system according to claim 4, wherein the skirt is shaped like an inversely truncated cone whose top is slightly convex and whose outside surface comprises a series of circular ribs from the base of said inversely truncated cone to the top thereof, said skirt being subjected to the same vibrations as said detector when the latter is pulsated by said solenoid, the truncated shape and said ribs on said skirt favoring the break-up of the glaze-ice that may be present on said skirt when the latter folds under the effect of pulsations produced by said solenoid.

8. A glaze-ice measurement system according to claim 7, which comprises a power source supplying said system, said power source being connected to a control system successively ordering the operation of said heating means and said release mehanism.

9. A glaze-ice measurement system according to claim 8, which comprises means to feed a low-voltage direct-current power supply and a small quantity of electrical energy to said system.

10. A glaze-ice measurement system according to claim 8, which comprises a decoder connected to said detector by an oscillator and to said release mechanism, said decoder being an integral part of a reception interface, which is connected to a transmission interface by a triaxial or coaxial cable, the transmission interface being an integral part of a microprocessor system acting as the brain of the measurement and control system.

11. A glaze-ice measurement system acccording to claim 10, wherein said reception interface produces a signal enabling the detector to be heated or agitated depending on need.

12. A glaze-ice measurement system according to claim 11, which comprises means to enable the transmission interface to translate signals sent by the microprocessor to the detector and the release mechanism and vice versa.

13. A glaze-ice measurement system according to claim 8, wherein the power source feeding the system is connected to an independent supply system, thereby enabling said masurement system to be installed if desired, in remote and isolated areas where conventional sources of electrical energy do not exist.

14. A glaze-ice measurement system according to claim 1, which comprises means of transmitting, by means of a data-transmission system, the measurements obtained by the system, to a microproccessor system.

15. A glaze-ice measurement system according to claim 14, wherein the data-transmission system utilizes satellites, micro-waves, telephone lines, or radio.

16. A glaze-ice measurement system according to claim 1, which comprises a memory integrated into said system and including a data-acquisition module and serving to compile results in the case of isolated stations that are not connected by a data-transmission system and/or in case of failure of the transmission system.

* * * * *